Nov. 1, 1932.  L. L. LEITNER  1,885,363
AIR SIGNAL VALVE
Filed Jan. 19, 1932
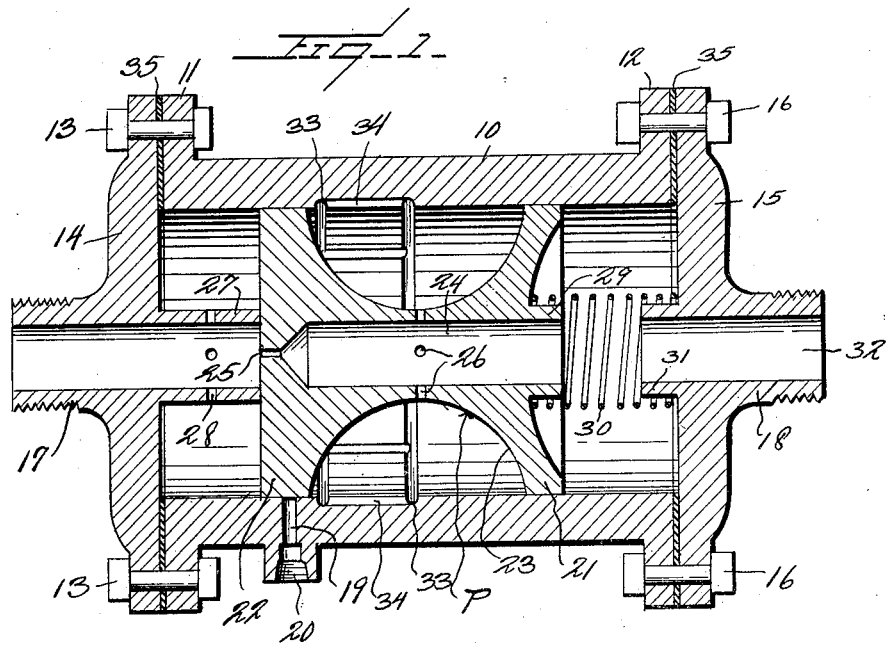
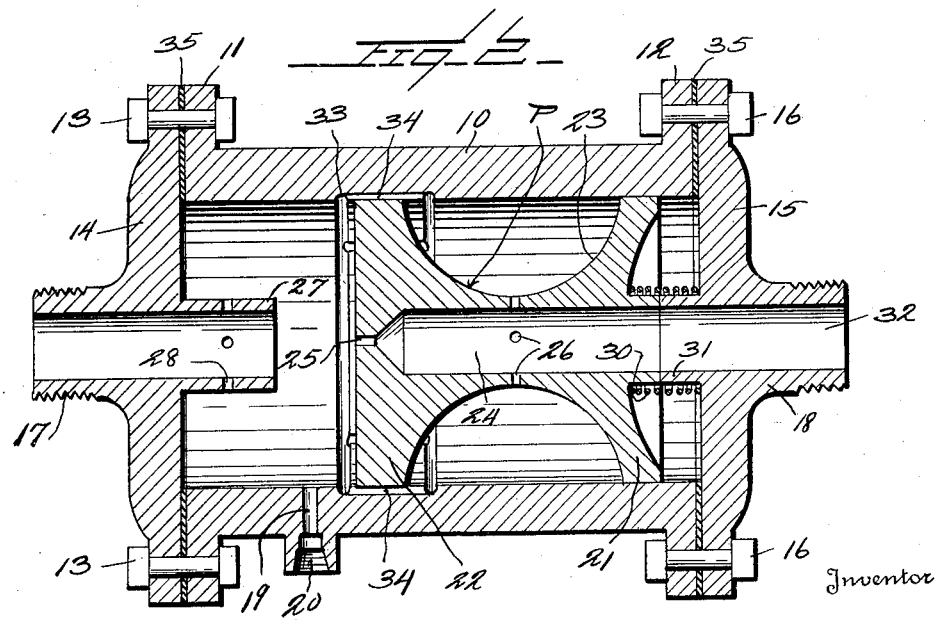
Inventor
L. L. Leitner
By Watson E. Coleman
Attorney Patented Nov. 1, 1932

1,885,363

UNITED STATES PATENT OFFICE

LAWRENCE L. LEITNER, OF SAN LUIS OBISPO, CALIFORNIA

AIR SIGNAL VALVE

Application filed January 19, 1932. Serial No. 587,601.

This invention relates to valves and more particularly to a valve adapted for use in operating a signal whistle.

An object of this invention is to provide a valve construction which is particularly adapted for use in the operation of a whistle or signal from a point remote from the valve.

Another object of this invention is to provide a valve which is interposed in a pressure line either air pressure or other fluid pressure and which will remain inoperative so long as the pressure on each side of the valve is equal but which will be moved into open or operative position upon decrease in the pressure on the discharge side of the valve.

A further object of this invention is to provide a simple valve structure of this kind having automatic closing means which automatically closes the valve upon equalization of the pressure on each side of the valve.

The above and various other objects and advantages of this invention will in part be described in and in part be understood from the following detailed description of the present preferred embodiment, the same being illustrated in the accompanying drawing, wherein:—

Figure 1 is a longitudinal section taken substantially through the center of a device constructed according to the preferred embodiment of this invention, showing the device in closed position.

Figure 2 is a similar view but showing the device in open position.

Referring to the drawing wherein like numerals of reference designate corresponding parts throughout the several views, the numeral 10 designates generally a valve casing or housing which is provided at one end with an annular flange 11 and at the opposite end with an annular flange 12. A head 14 engages against one end of the casing 10 and is secured thereto by bolts or securing members 13 extending through the flange 11 and a second head 15 is secured to the opposite end of the casing 10 by means of securing members 16. This head 14 is provided with a threaded nipple 17 for connection to a pressure line such as an air pressure or other fluid pressure line and in like manner, the head 15 is provided with a threaded nipple 18 for connection to a discharge line extending to a point remote from the valve housing 10. An outlet port 19 is provided in the wall of the housing 10 at a point adjacent the forward end thereof and a nipple 20 communicates with this outlet port and is adapted to be connected to a signal in the form of a whistle or other pressure operated signal.

A piston, generally designated as P, is slidably mounted within the housing or cylinder 10 and is provided with a guide portion 21 disposed rearwardly from the head 22 thereof. The piston P is provided with a relatively large peripheral groove 23 intermediate the head 22 and the guide portion 21, and is also provided with an axially disposed bore 24 terminating at the forward end thereof in a restricted bleeder opening 25. The piston P is also provided with ports 26 extending through the body or stem 23 thereof which communicate with the bore 24, the purpose for which will be hereinafter described. The head 14 is provided with a cylindrical extension 27 which extends inwardly of the casing or cylinder 10 and is provided at a point intermediate its ends with discharge ports 28 through which the fluid is adapted to be discharged into the cylinder 10.

The piston P is also provided with an annular extension 29 and a spring 30 is disposed about this extension 29 and engages against one face of the guide portion 21 and the opposite end of the spring 30 is disposed about an annular extension 31 carried by the head 15. The opposite end of the spring 30 engages against the inner face of this head 15 and the extensions 29 and 31 operate to maintain the spring 30 concentrically of the piston P.

The cylinder or casing 10 is provided at a point intermediate the signal port 19 and the discharge port 32 in the head 15 with annular grooves 33 spaced one from the other and these annular grooves 30 are connected by longitudinally extending grooves 34 so that when the piston head 22 slides over the first annular groove 33, the fluid pressure will be released by passing about the periphery of the piston head 22 and entering the space between the head 22 and the guide 21 and passing through the outlet ports 26 and out through the discharge port 32. In this manner, a quick release or equalization of the pressure against the head 22 is effected so that the spring 30 will return the piston 22 to a point where it will be disposed over the signal port 19 and thereby close the port. The inner end of the annular extension 27 operates as a stop for limiting the forward movement of the piston P, and this forward movement is stopped at a point where head 22 closes the signal port 19. The heads 14 and 15 may be sealed to the flanges 11 and 12 respectively by means of conventional gaskets 35 or the like.

In the operation of this device, the valve housing or cylinder 10 may be connected or interposed in a fluid pressure line such as air and the nipple 20 connected to a fluid operated signal. When the pressure on the discharge side of the casing 10 is reduced by opening a valve or the like at a point remote from the housing 10, the pressure passing through the head 14 will force the piston P into open position and permit a portion of the pressure to pass through the signal discharge port 19 while the remaining fluid pressure will be released partially through the longitudinal grooves 34 after the head 22 has passed the first annular groove 33. It is, of course, understood that the bleeder opening 25 will permit a small quantity of the fluid pressure to pass axially through the piston P, but this bleeder opening 25 is only provided so as to permit the equalization of the pressure after the piston has been returned to closed position by the spring 30.

In practice, the valve casing 10 has been particularly designed for connection to an air pressure line of a railway car such as a passenger car or the like and if desired, the valve casing 10 may be mounted on the engine with the signal disposed closely adjacent thereto whereas the releasing valve, not shown, may be mounted at any point on the passenger or railway car for operation by a person remotely disposed from the casing and the engine. In this manner, the trainman can signal the engineer from one end of the train by merely opening the valve in the air line so as to reduce the pressure in the air line on the discharge side of the valve casing 10. It is also to be noted that the annular extension 31 will contact with the extension 29 and operate as a stop for limiting the movement of the piston P in one direction in the housing whereas the annular stop member 27 limits the forward movement of the piston P.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A signal valve comprising a cylinder having opposed intake and exhaust ports, and a signal port intermediate said ports, a piston slidable between said intake and exhaust ports, and means for automatically returning said piston to a position overlying said signal port for closing thereof, said means including a bleeder opening through the piston to equalize the pressure on each side thereof.

2. A signal valve comprising a cylinder having spaced intake and exhaust ports and a signal port intermediate each of said ports, a piston slidable between the intake and exhaust ports and closing the signal port upon movement thereof in one direction and opening the signal port upon movement thereof in the opposite direction, said piston having a bleeder opening therethrough to equalize the pressure on each side of the piston and a spring engaging one end of the cylinder and one end of the piston whereby to automatically move the piston into closed position upon equalization of the pressure on each side thereof.

3. A signal valve comprising a cylinder having opposed intake and exhaust ports and a signal port intermediate said ports, a piston slidable between said intake and exhaust ports, said piston having a bleeder opening in one end thereof, and a passage opening through the opposite end thereof, said cylinder having passages at a point intermediate the signal port and the exhaust port whereby to permit the passage of fluid past the piston and through said piston passage to equalize the pressure on each side of the piston, and a spring mounted in the cylinder and engaging the piston to return the piston to closed position overlying the signal port upon equalization of the pressure on each side thereof.

4. A signal valve comprising a cylinder having opposed intake and exhaust ports and a signal port intermediate said ports, said cylinder having a plurality of longitudinally extending grooves opening on the inner surface thereof and disposed intermediate the signal port and the exhaust port, a piston slidably mounted in the cylinder, means for normally maintaining the piston in a position overlying the signal port, said piston having a head portion of a length less than the length of said grooves whereby to permit the passage of a fluid about the periphery of the piston upon movement thereof into open position.

5. A signal valve comprising a cylinder having opposed intake and exhaust ports and a signal port intermediate said ports, said cylinder having longitudinally extending grooves opening on the inner surface thereof and disposed intermediate the signal port and the exhaust port, a piston slidable between the intake and exhaust ports, said piston having a head of a length less than the length of said grooves whereby to permit the passage of fluid about the periphery of the head upon movement thereof into open position, means for constantly urging the piston into closed position, and stop means carried by the piston and the cylinder to limit the movement thereof in either direction.

6. A signal valve comprising a cylinder having opposed intake and exhaust ports and a signal port intermediate said ports, said cylinder having a plurality of longitudinally extending grooves opening on the inner surface thereof, said grooves terminating at each end in an annular groove also opening on the inner surface of the cylinder, a piston slidable in the cylinder and having a head of a length less than the length of the grooves whereby to permit the quick passage of fluid about the periphery of the piston head to equalize the pressure on each side of the head, a guide member carried by the piston and engaging the cylinder, means for constantly urging the piston into closed position overlying the signal port, and stop means carried by the piston and the cylinder whereby to limit the movement of the piston in either direction.

7. A signal valve comprising a cylinder having opposed intake and exhaust ports, and a signal port intermediate said ports, said cylinder having a plurality of longitudinally extending and circumferentially spaced grooves opening on the inner surface thereof, a piston having a head of a length less than the length of the grooves whereby to permit the free passage of fluid past the head upon movement thereof into open position, a guide member carried by the piston and disposed in spaced relation to the head, the piston having a reduced intermediate portion, said piston also having an enlarged axial bore terminating at the forward end in a bleeder opening, said piston also having a plurality of laterally extending passages communicating at one end with the bore and at the opposite end with the interior of the cylinder, a spring engaging at one end against one end of the cylinder and at the opposite end against the guide whereby to constantly urge the piston into closed position, and stop means carried by the piston and the cylinder to limit the movement thereof in either direction.

In testimony whereof I hereunto affix my signature.

LAWRENCE L. LEITNER.